US009755758B2

(12) United States Patent
Philipson et al.

(10) Patent No.: US 9,755,758 B2
(45) Date of Patent: Sep. 5, 2017

(54) SPECTRAL ANALYSIS USING A SPATIAL LIGHT MODULATOR

(71) Applicant: VIAVI SOLUTIONS INC., Milpitas, CA (US)

(72) Inventors: Josh Philipson, Ottawa (CA); Chris Wagner, Kanata (CA)

(73) Assignee: VIAVI SOLUTIONS INC., Milpitas, CA (US)

(*) Notice: Subject to any disclaimer, the term of this patent is extended or adjusted under 35 U.S.C. 154(b) by 30 days.

(21) Appl. No.: 14/994,762

(22) Filed: Jan. 13, 2016

(65) Prior Publication Data

US 2017/0201326 A1  Jul. 13, 2017

(51) Int. Cl.
| | |
|---|---|
| *H04B 17/00* | (2015.01) |
| *H04B 10/556* | (2013.01) |
| *H04J 14/02* | (2006.01) |
| *H04B 10/079* | (2013.01) |
| *H04Q 11/00* | (2006.01) |
| *H04B 10/572* | (2013.01) |
| *H04B 10/54* | (2013.01) |
| *H04B 10/532* | (2013.01) |

(52) U.S. Cl.
CPC ..... *H04B 10/5563* (2013.01); *H04B 10/0793* (2013.01); *H04B 10/07955* (2013.01); *H04B 10/532* (2013.01); *H04B 10/541* (2013.01); *H04B 10/572* (2013.01); *H04J 14/0212* (2013.01); *H04Q 11/0066* (2013.01); *H04Q 2011/0016* (2013.01); *H04Q 2011/0083* (2013.01)

(58) Field of Classification Search
CPC . H04L 5/0048; H04L 5/0007; H04L 27/2628; H04L 27/265; H04L 5/0023; H04L 27/2613; H04L 27/2657; H04L 25/0206; H04L 2027/0024; H04B 7/0413; H04B 2201/70701; H04J 13/18
USPC .......................................................... 398/19
See application file for complete search history.

(56) References Cited

U.S. PATENT DOCUMENTS

| | | | | |
|---|---|---|---|---|
| 5,504,575 | A | * 4/1996 | Stafford | G01J 3/28 356/328 |
| 5,917,627 | A | * 6/1999 | King | H04J 14/08 398/154 |
| 6,108,123 | A | * 8/2000 | Kinoshita | H04J 14/0246 359/337 |
| 6,424,439 | B1 | 7/2002 | King | |

\* cited by examiner

*Primary Examiner* — Juan A Torres
(74) *Attorney, Agent, or Firm* — Mannava & Kang, P.C.

(57) ABSTRACT

According to an example, an optical transmission device may include a spatial light modulator having a plurality of cells, in which different wavelengths of a light beam are to impinge upon different groups of pixels along a dispersion direction. The device may also include a driver mechanism to modulate, at a first frequency, a first group of the plurality of cells upon which light having a first wavelength impinges to impress a first frequency fluctuation onto a property of an output light including the first wavelength and to modulate, at a second frequency, a second group of the plurality of cells upon which light having a second wavelength impinges to impress a second frequency fluctuation onto a property of an output light including the second wavelength, in which the second frequency modulation differs from the first frequency modulation.

20 Claims, 9 Drawing Sheets

```
┌─────────────────────────────────────────────┐
│ MODULATE, AT A FIRST FREQUENCY, A FIRST GROUP OF │
│ PIXELS UPON WHICH LIGHT HAVING A FIRST WAVELENGTH │
│ IMPINGES TO IMPRESS A FIRST FREQUENCY FLUCTUATION │
│ ONTO A PROPERTY OF AN OUTPUT LIGHT INCLUDING THE │
│              FIRST WAVELENGTH               │
│                   402                       │
└─────────────────────────────────────────────┘
```

```
┌─────────────────────────────────────────────┐
│ MODULATE, AT A SECOND FREQUENCY, A SECOND GROUP │
│   OF PIXELS UPON WHICH LIGHT HAVING A SECOND │
│   WAVELENGTH IMPINGES TO IMPRESS A SECOND   │
│  FREQUENCY FLUCTUATION ONTO A PROPERTY OF AN │
│ OUTPUT LIGHT INCLUDING THE SECOND WAVELENGTH │
│                   404                       │
└─────────────────────────────────────────────┘
```

```
┌─────────────────────────────────────────────┐
│  MODULATE, AT MULTIPLE RESPECTIVE FREQUENCIES, │
│  RESPECTIVE GROUPS OF PIXELS BASED UPON THE  │
│  WAVELENGTHS OF LIGHT IMPINGING ON THE GROUPS OF │
│                   PIXELS                     │
│                    502                       │
└─────────────────────────────────────────────┘
                      ↓
┌─────────────────────────────────────────────┐
│  DETECT FLUCTUATIONS IN A PROPERTY OF THE OUTPUT │
│   LIGHT DIRECTED FROM THE SPATIAL LIGHT MODULATOR │
│            OVER A PERIOD OF TIME             │
│                    504                       │
└─────────────────────────────────────────────┘
                      ↓
┌─────────────────────────────────────────────┐
│  DETERMINE, FROM THE DETECTED FLUCTUATIONS OVER │
│  THE PERIOD OF TIME, AT LEAST ONE FRQUENCY AT WHICH │
│   THE PROPERTY OF THE OUTPUT LIGHT FLUCTUATES │
│                    506                       │
└─────────────────────────────────────────────┘
                      ↓
┌─────────────────────────────────────────────┐
│       IDENTIFY, FROM THE DETERMINED AT LEAST ONE │
│      FREQUENCY AT WHICH THE PROPERTY OF THE OUTPUT │
│      LIGHT FLUCTUATES, AT LEAST ONE WAVELENGTH OF LIGHT │
│            CONTAINED IN THE OUTPUT LIGHT     │
│                    508                       │
└─────────────────────────────────────────────┘
                      ↓
┌─────────────────────────────────────────────┐
│      ANALYZE THE OUTPUT LIGHT ACCORDING TO THE │
│    IDENTIFIED AT LEAST ONE WAVELENGTH OF LIGHT │
│                    510                       │
└─────────────────────────────────────────────┘
```

SPECTRAL ANALYSIS USING A SPATIAL LIGHT MODULATOR

BACKGROUND

High speed data transmission networks typically rely on optoelectronic components for transmission, reception, filtering and processing in order to analyze, detect and assess signal quality of optical signals. An optical performance monitor or optical channel monitor is often used to analyze and measure the quality of the optical signal transmissions. The results of the analysis are typically used to identify faults and to improve control over the optical signal transmissions.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on. The terms "first" and "second" as used herein are not intended to denote any particular order or placement of an element. Instead, these terms are used herein to denote that one element differs from another element.

Additionally, it should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures.

Disclosed herein are optical transmission devices and methods for performing spectral analysis using a spatial light modulator. In the devices and methods disclosed herein, a spatial light modulator may impress different frequencies of fluctuation onto different wavelengths, i.e., colors, of light that impinge on the spatial light modulator. Particularly, the spatial light modulator may be composed of a plurality of pixels (which are also equivalently called "cells" herein) that extend along an axis such that different wavelengths of a light beam impinge on different pixels or sets of pixels of the plurality of pixels along the axis. The pixels may have any of a number of different shapes, such as square, rectangular, etc., shapes. In addition, different frequencies of modulation, which are also referenced herein as frequencies of oscillation, may be applied to the different pixels such that the pixels imprint different time dependent signals on the different wavelengths of the impinging light. In other words, light impinging onto the spatial light modulator may be impressed with different signatures depending upon the wavelength of the light. Moreover, by detecting the frequencies of fluctuation in output light signals directed from the spatial light modulator, a determination may be made as to the wavelengths of light contained in the output light. As such, a frequency dependent signature of the output light directed from the spatial light modulator may be detected.

Through implementation of the devices and methods disclosed herein, spectral information regarding an ingress light may be inferred by detecting the frequency dependent signature on the output light directed from the spatial light modulator. According to an example, the optical transmission device disclosed herein is a wavelength selective switch and the spatial light modulator is housed within the wavelength selective switch. In another example, the optical transmission device disclosed herein is a tunable filter.

Figure 1:
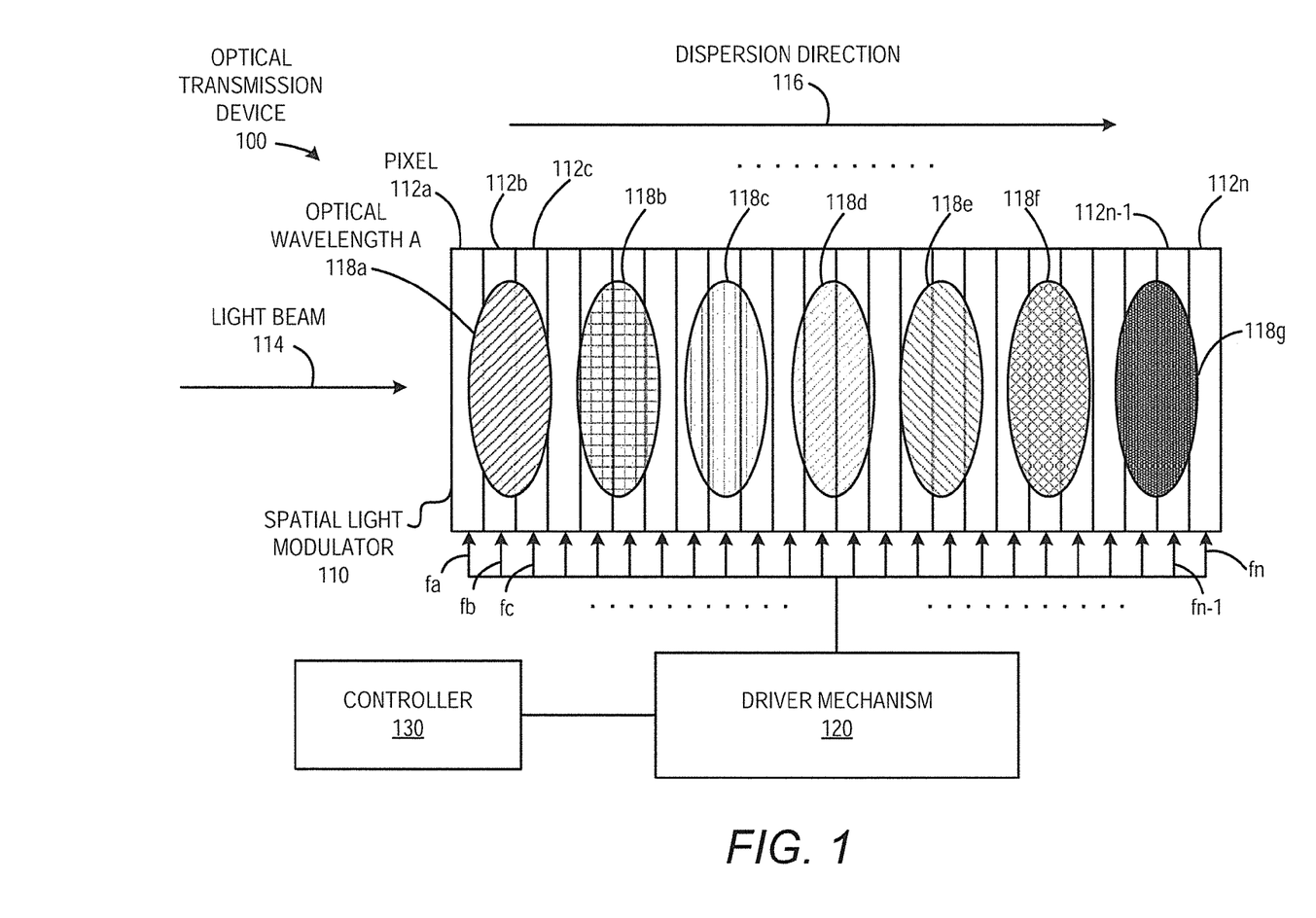
FIG. 1 shows a simplified block diagram of an optical transmission device, according to an example of the present disclosure.

FIG. 1 shows a simplified block diagram of an optical transmission device 100, according to an example of the present disclosure. As shown, the optical transmission device 100 may include a spatial light modulator 110, a driver mechanism 120, and a controller 130. The spatial light modulator 110 may be a device that imposes a fluctuation on a property of output light based upon the wavelengths of light that impinge on the spatial light modulator 110. According to an example, the spatial light modulator 110 is a liquid crystal on silicon (LCOS) panel. However, it should be understood that the spatial light modulator 110 may be formed of any other suitable type of panel. The property may be, for instance, an intensity, a phase, a polarization state, etc., of the light and the fluctuation may be an oscillation of the property between distinguishable states. By way of example, the fluctuation of a property, such as intensity, may be a fluctuation in which the intensity oscillates between a first intensity level and a second intensity level. As discussed in greater detail herein below, the spatial light modulator 110 may imprint the output light with different rates (e.g., frequencies) at which the property of the output light fluctuates, in which the different rates correspond to different wavelengths of the light. Thus, the wavelengths of light that impinge upon the spatial light modulator 110 may be imprinted with a different signature.

The spatial light modulator 110 is depicted as including a plurality of pixels 112a-112n, in which the variable "n" represents an integer greater than one. Each of the pixels 112a-112n depicted in FIG. 1 may represent an individually addressable pixel or groups of pixels that may be modulated independently with respect to each other. In other words, the pixels 112a-112n may be controlled to impress a different modulation on a property of the light that impinges on the pixels 112a-112n as compared with the other pixels 112a-112n. For instance, the pixels 112a-112n of the spatial light modulator 110 may be modulated to cause the property of the light to fluctuate at particular frequencies depending upon which of the pixels 112a-112n the light impinges. The pixels 112a-112n may directly modulate the property, such as intensity, or may cause a fraction of the energy to be time-dependently modulated such that a fraction of the power is attenuated from a capturing fiber (i.e., the loss mechanism is at the fiber). In an example, therefore, the spatial light modulator 110 may be implemented such that the loss in energy may not necessarily have to occur at the pixels 112a-112n, but the spatial light modulator 110 may impress a property, such as phase, which indirectly changes the light property and the loss mechanism via misalignment or offset at the captured fiber due to intermediate optics.

Although particular reference is made herein to the spatial light modulator 110 being formed of pixels 112a-112n, it should be understood instead of pixels, the spatial light modulator 110 may be construed as being formed of cells or panels. It should thus be understood that the terms pixels, cells, and panels may be used interchangeably herein.

As also shown in FIG. 1, a input light beam 114 is depicted as being dispersed across the pixels 112a-112n along a dispersion direction 116, in which the dispersion direction 116 extends across the spatial light modulator 110. More particularly, the light beam 114 is depicted as being dispersed across the pixels 112a-112n along the dispersion direction 116 such that the various optical wavelengths 118a-118g of light forming the light beam 114 are dispersed and impinge on a respective one or more of the pixels 112a-112n. In this regard, a spatial dependence between the impinging optical wavelengths 118a-118g and the pixels 112a-112n may exist. This spatial dispersion allows access to the optical frequency vs. positional processing capability to enable position along the spatial light modulator 110 to be equated with optical wavelength/frequency. Although not shown, various optical components, e.g., gratings, lenses, etc., may be employed to disperse the light beam 114 onto the spatial light modulator 110 along the dispersion direction 116.

Although the various optical wavelengths 118a-118g have been depicted as being discrete spots on the spatial light modulator 110, it should be understood that the optical wavelengths 118a-118g of light may instead include a continuum of optical wavelengths along the dispersion direction 116. In this regard, the depiction of eight optical wavelengths 118a-118g is merely for simplicity and illustrative purposes and thus any number of wavelengths of light may be impinged onto the spatial light modulator 110.

It should be understood that the pixels 112a-112n have been depicted as being vertically arranged pixels or groups of pixels for purposes of illustration and not of limitation. The pixels 112a-112n may thus have other forms without departing from a scope of the optical transmission device 100. For instance, instead of the oval spots representing the optical wavelengths 118a-118, the actual dispersion of the light beam 114 onto the spatial light modulator 110 may result in relatively more complex shapes. By way of example, the dispersion of the ingress light 114 may result in curved shapes, e.g., curved stripes, that extend in the dispersion direction 116. In this example, each of the pixels 112a-112n depicted in FIG. 1 may be formed of multiple pixels for instance in a two-dimensional array and the pixels may be modulated in respective groups that substantially correspond to the shapes at which the optical wavelengths 112a-112n of light impinge on the pixels 112a-112c.

That is, a first group of pixels upon which light having a first optical wavelength 118a impinges may be modulated at a first frequency, a second group of pixels upon which light having a second optical wavelength 118b impinges may be modulated at a second frequency, and so forth. The pixels 112a-112n may thus be controlled to account for extraneous issues, such as light beam aberrations.

As further shown in FIG. 1, the controller 130 may control the driver mechanism 120 to send driving signals to the pixels 112a-112n. The driver mechanism 120 may include circuitry for modulating the pixels 112a-112n. For instance, the driver mechanism 120 may include circuitry for applying power (e.g., voltage) to the pixels 112a-112n, in which application of the power is to cause the pixels 112a-112n to impress a fluctuation, e.g., a phase or intensity fluctuation, on the light impinging on the pixels 112a-112n. Particularly, the driver mechanism 120 may apply power in a non-continuous manner to the pixels 112a-112n, e.g., the driver mechanism 120 may fluctuate the delivery of power between on and off states at a relatively high frequency level to prevent damaging components, e.g., liquid crystals, forming the pixels 112a-112n. In other words, the driver mechanism 120 may apply a time-dependent modulated power to the pixels 112a-112n.

According to an example, the controller 130 is to control the frequencies or refresh rates at which the driver mechanism 120 delivers power to the pixels 112a-112n. For instance, the controller 130 may control the driver mechanism 120 such that different groups of the pixels 112a-112n receive power at different frequencies with respect to each other. It should be noted that the term "groups" as used herein may be defined as including one or more of the pixels. As a result, the groups of pixels 112a-112n may be modulated at different frequencies with respect to each other. As shown in FIG. 1, the controller 130 may control the driver mechanism 120 to apply different frequencies of modulation (fa-fn) to the pixels 112a-112n.

According to an example in which light from the dispersed light beam 114 having particular optical wavelengths 118a-118g impinge upon multiple ones of the pixels 112a-112n, the same frequency of modulation may be applied to the multiple pixels on which a particular wavelength of light impinges. For instance, the pixels upon which the light having the optical wavelength 118c may each be modulated at the same frequency. In another example, however, a pixel that is most centered with respect to the impinged light of a particular optical wavelength may be modulated at a particular frequency while the other pixels on which the light of the particular optical wavelength impinges is modulated at a different, for instance, nominal, frequency. In this example, for the impinged light having the optical wavelength 118a, the pixel 112b may be modulated at a particular frequency fb that differs from the modulation frequencies of the pixels 112a and 112c. As discussed above, the frequencies at which the pixels 112a-112n are modulated may result in properties of light having different wavelengths to fluctuate at different frequencies with respect to each other.

In any regard, the driver mechanism 120 may apply different frequencies of modulation to at least some of the plurality of pixels 112a-112n to impress a different frequency fluctuations onto the different optical wavelengths 118a-118n of output light directed from the spatial light modulator 110. The driver mechanism 120 may also apply the modulation in a time dependent manner. As a result, different time dependent signals or modulations (time-dependent modulation of the property of the light, e.g., intensity, phase, polarization state, etc.) may be impressed onto the different wavelengths of the output light directed from the spatial light modulator 110. As described in greater detail herein below, the output light (or equivalently, output signal) directed from the spatial light modulator 110 may be processed to determine the different time dependent signals contained in the output light. In addition, the different time dependent signals may be analyzed to determine the wavelengths of light contained in the output light from the spatial light modulator 110.

The controller 130 may be a central processing unit (CPU), a microprocessor, a processor, an application specific integrated circuit (ASIC), a system-on-chip (SoC), or the like. The controller 130 may be programmed with the correlations between the frequencies of modulation (or oscillation) and the pixels 112a-112n. In addition or alternatively, the correlations may be stored in a computer-readable storage medium and the controller 130 may access that information in controlling the driver mechanism 120. In another example, the controller 130 may be integrated with the driver mechanism 120, such as on a circuit chip or a system on a chip.

Figure 2:
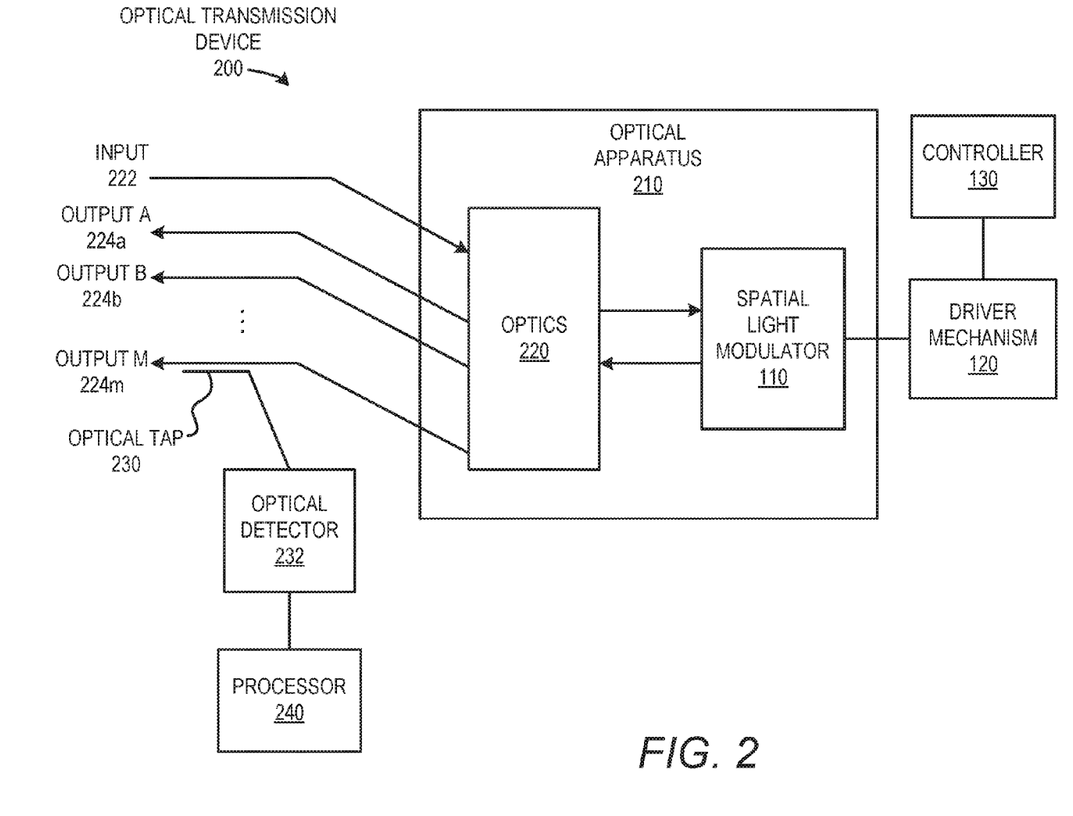
FIGS. 2 and 3 respectively show simplified block diagrams of an optical transmission device, according to two additional examples of the present disclosure.

With reference now to FIG. 2, there is shown a simplified block diagram of an optical transmission device 200, according to another example. The optical transmission device 200 is depicted as including all of the same components as the optical transmission device 100 depicted in FIG. 1. The descriptions of the spatial light modulator 110, the driver mechanism 120, and the controller 130 provided above with respect to FIG. 1 are intended to also describe these components in FIG. 2. As such, descriptions of these components are not repeated in detail with respect to FIG. 2.

In FIG. 2, the spatial light modulator 110 is depicted as being part of an optical apparatus 210. According to an example, the optical apparatus 210 is a wavelength selective switch, a tunable filter, a bulk optic apparatus, an integrated optical waveguide apparatus or system, or the like. The spatial light modulator 110 is depicted as being a component of the optical apparatus 210. As also shown in FIG. 2, the optical apparatus 210 may include optics 220 that are to receive ingress light through an input 222, which may be an optical fiber. The optics 220, which may include any of a number of suitable optical components, such as lenses, polarizers, mirrors, diffraction elements, beamsplitters, gratings, etc., to direct and disperse a light beam 114 onto the spatial light modulator 110. The optics 220 may also include optical components to direct output light from the spatial light modulator 110 to the appropriate output 224a-224m, for instance, as selected by the spatial light modulator 110. The outputs 224a-224m, in which the variable "m" may represent an integer value greater than one and may differ from the variable "n" discussed above, may also be optical fibers.

An input light beam 114 containing one or more wavelengths of light may be inputted into the optical apparatus 210 through the input 222 and the optics 220 may disperse the ingress light 114 across the spatial light modulator 110 along a dispersion direction 116, for instance as discussed above with respect to FIG. 1. That is, the light beam 114 may be dispersed such that there is a spatial coordinate dependence along the dispersion direction 116 between the dispersed optical wavelengths and the spatial light modulator 110. According to an example, the pixels 112a-112n in the spatial light modulator 110 may each include a liquid crystal layer that may apply selected phase delays on the impinging optical wavelengths to control angles at which the optical wavelengths of light are reflected. By controlling the phase delays, light having different optical wavelengths may be directed to different ones of the outputs 224a-224m. For instance, the spatial light modulator 110 may control the phase delay applied to a particular optical wavelength to steer light at that particular optical wavelength to the first output 224a. As such, the optical apparatus 210 may perform switching functions on the light beam 114 based upon the wavelength or wavelengths of light forming the light beam 114.

In any regard, to apply the selected phase delays, a voltage may be applied to the pixels. As discussed above, the voltage may be applied with a time dependent modulation. That is, the voltage may be turned on and off at a high rate of change instead of being applied continuously, for instance, to prevent damaging the liquid crystals in the pixels. In addition, as also discussed above, the controller 130 may control the driver mechanism 120 to apply different frequencies of modulation (or, equivalently, oscillation) to different pixels 112a-112n or groups of pixels. In other words, the driver mechanism 120 may apply voltage to different ones of the pixels at different modulation frequencies. The various wavelengths of light outputted (for instance, reflected) from the different pixels 112a-112n of the spatial light modulator 110 may thus be impressed with different frequency modulations (e.g., intensity or phase frequency modulations) with respect to each other. In other words, light having a first optical wavelength outputted from the spatial light modulator 110 may be impressed with a first frequency fluctuation and light having a second optical wavelength outputted from the spatial light modulator 110 may be impressed with a second frequency fluctuation.

In addition, the light outputted from the spatial light modulator 110 may be directed to one or more of the outputs 224a-224m depending, for instance, on the wavelength(s) of the light. That is, the spatial light modulator 110, by changing the phase delays on the light depending upon the wavelength of the light, may direct light having a first or second wavelength to a first output 224a, light having a third wavelength to a second output 224b, and so forth. In the example depicted in FIG. 2, an optical tap 230 may be coupled to one of the outputs 224m such that part of the light directed through the output 224m is directed to an optical detector 232. The optical detector 232, which may be any suitable type of detector, such as a photodiode, may detect a property of the output light as well as a frequency or frequencies at which the property of the output light fluctuates. For instance, the optical detector 232 may detect fluctuations in the amount of power (i.e., intensity) of the output light over a period of time or the amount of phase change of the output light over a period of time. The fluctuations in the amount of power (or the amount of phase change) detected by the optical detector 232 may correspond to the frequency or frequencies at which the wavelengths in the output light were modulated.

As further shown in FIG. 2, the optical detector 232 may communicate the detected frequency or frequencies of fluctuations of the property in the output light to a processor 240. The processor 240, which may be a central processing unit (CPU), a microprocessor, a processor, an application specific integrated circuit (ASIC), a system-on-chip (SoC), or the like, may determine the frequency of the fluctuations (e.g., which may be on-off cycles, power modulation cycles in which a difference in the power modulations in the cycles is less than 100% and greater than 0%, phase change cycles, etc.) occurring during the period of time from the received detected power and/or phase change levels. From that determination, the processor 240 may determine the frequency fluctuation or frequency fluctuations contained in the output light, and may infer the amount of power in that optical band. That is, the processor 240 may measure periodic, finite-length time-records of the output light, which may have been impressed with a frequency fluctuation or frequency fluctuations. In addition, the processor 240 may perform appropriate signal processing on the records to identify the frequency fluctuation or frequency fluctuations contained in the output light and determine the power level of that carrier. By way of example, the processor 240 may apply a function, such as the Fourier transform, on the records to identify the frequency fluctuation or frequency fluctuations and power level contained in the output light.

The processor 240 may also identify the optical wavelength or optical wavelengths contained in the output light from the identified frequency fluctuation or frequency fluctuations. That is, the processor 240 may be programmed with or may access a database containing information pertaining to the correlations between frequency fluctuations and optical wavelengths applied by the spatial light modulator 110. The processor 240 may also analyze the output light to perform optical channel monitor or optical spectrum analysis functions.

According to an example, the output 224*m* to which the optical tap 230 has been provided may operate as a monitor line. In this example, a portion of the output light directed to the other outputs 224*a*-224*m*-1 may be directed to the output 224*m*. The optics 220 may include components for directing portions of the output light intended for the outputs 224*a*-224*m*-1 to be directed to the output 224*m*. In this example, the processor 240 may perform analysis on output light directed to some or all of the outputs 224*a*-224*m*-1 while a single output 224*m* is optically tapped.

Figure 3:
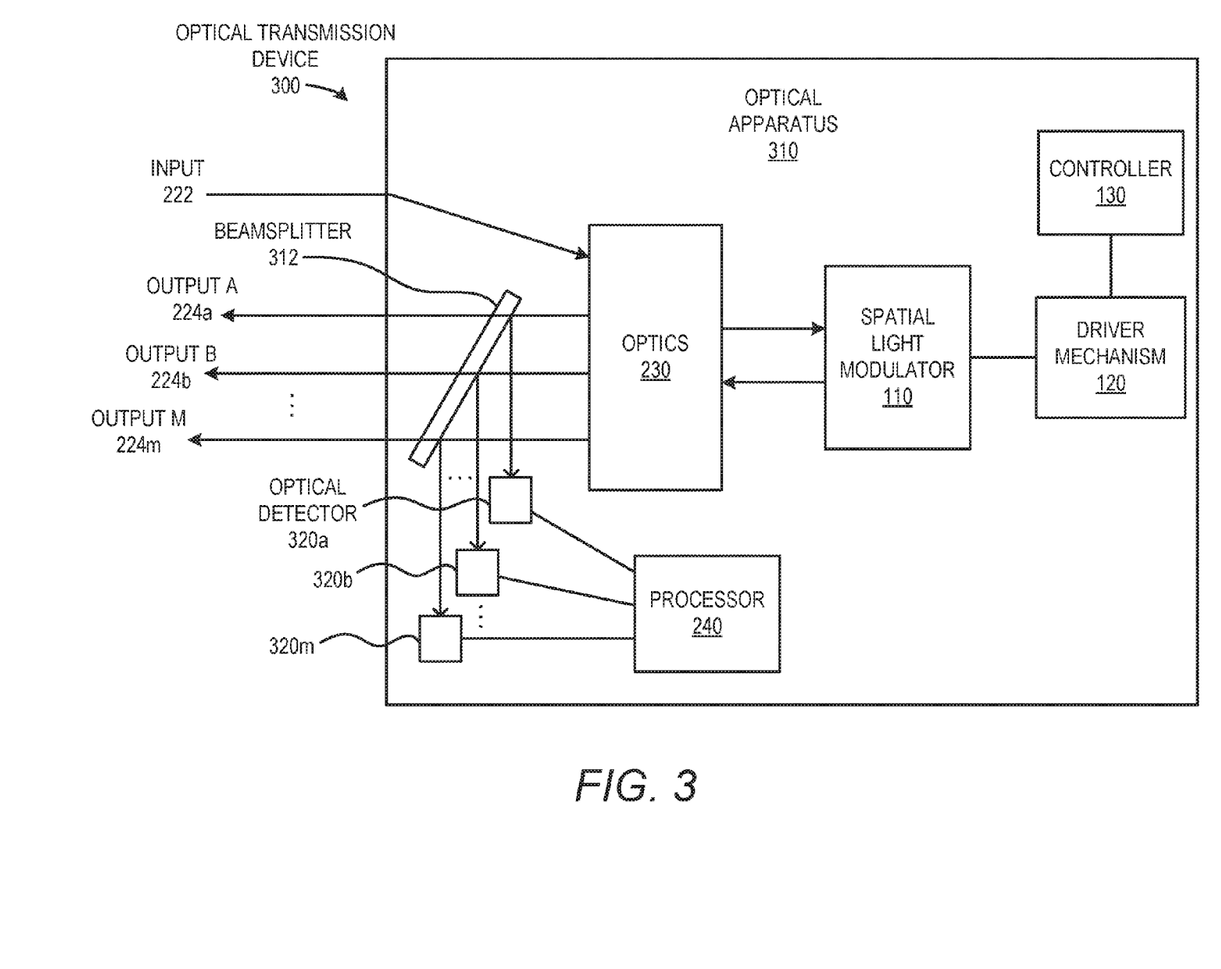

Turning now to FIG. 3, there is shown a simplified block diagram of an optical transmission device 300, according to another example. As shown, the optical transmission device 300 includes all of the same components as the optical transmission devices 100, 200 depicted in FIGS. 1 and 2. The descriptions of the spatial light modulator 110, the driver mechanism 120, the controller 130, the optics 220, the input 222, and the outputs 224*a*-224*m* provided above with respect to FIGS. 1 and 2 are intended to also describe these components in FIG. 3. As such, descriptions of these components are not repeated in detail with respect to FIG. 3.

The optical transmission device 300 is depicted as including an optical apparatus 310. Similarly to the optical apparatus 210 in FIG. 2, the optical apparatus 310 may be a wavelength selective switch, tunable filter, or the like. However, the optical apparatus 310 is depicted as also including the driver mechanism 120 and the controller 130. In addition, the optical apparatus 310 is depicted as including a beamsplitter 312 that is to split the output light directed to each of the outputs 224*a*-224*m* such that portions of the output light are directed to respective optical detectors 320*a*-320*m*. Each of the optical detectors 320*a*-320*m* may function similarly to the optical detector 232 discussed above with respect to FIG. 2. In addition, each of the optical detectors 320*a*-320*m* may communicate detected signals to the processor 240, which may process and analyze the received signals as discussed above. In this regard, the processor 240 may process and analyze output light that is directed to each of the outputs 224*a*-224*m*.

Although the controller 130 and the processor 240 have been depicted in FIGS. 2 and 3 as being separate components, it should be understood that the controller 130 and the processor 240 may be the same component without departing from a scope of the optical transmission devices 200, 300 disclosed herein.

Figure 4:
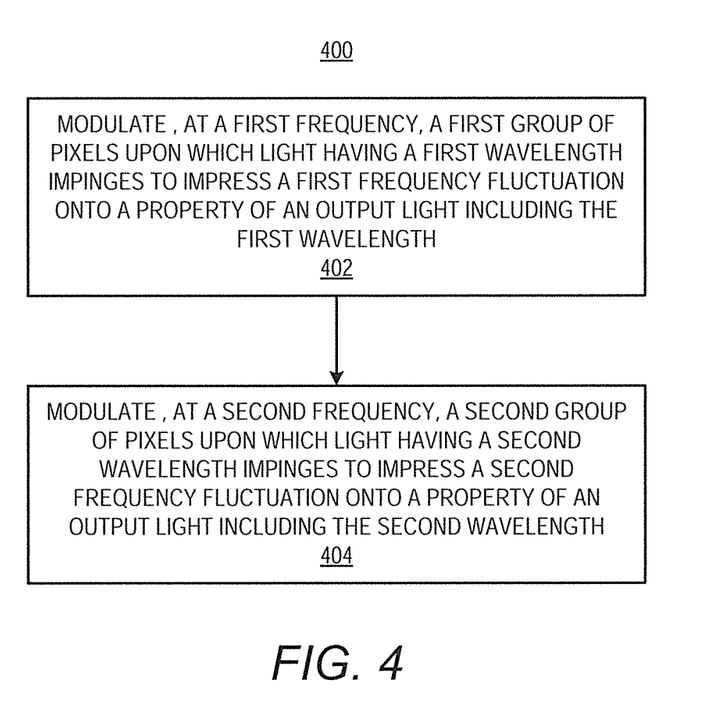
FIGS. 4 and 5 respectively show flow diagrams of methods and for performing spectral analysis using a spatial modulator, according to two examples of the present disclosure.
Figure 5:
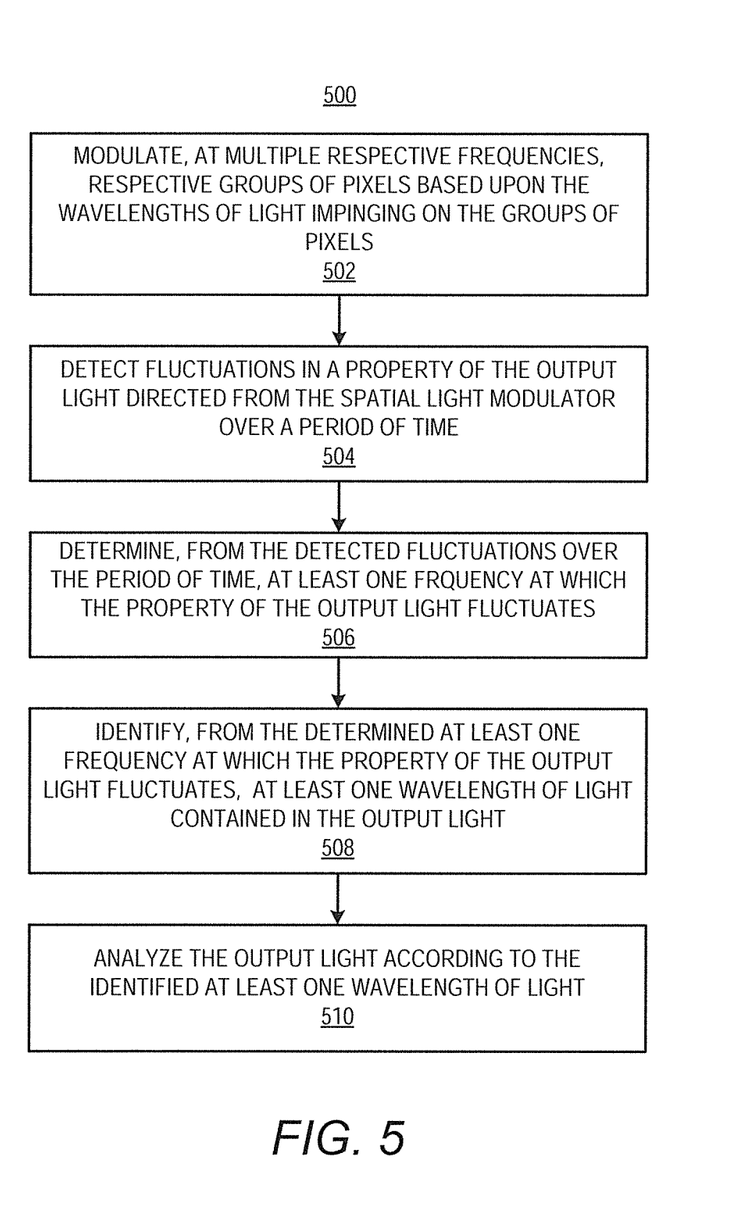

With reference now to FIGS. 4 and 5, there are respectively shown flow diagrams of methods 400 and 500 for performing spectral analysis using a spatial light modulator, according to two examples. The method 500 is related to the method 400 in that the method 500 provides additional detail with respect to the features recited in the method 400. It should be understood that the methods 400 and 500 depicted in FIGS. 4 and 5 may include additional operations and that some of the operations described therein may be removed and/or modified without departing from the scopes of the methods 400 and 500.

With reference first to FIG. 4, at block 402, a first group of a plurality of pixels in a spatial light modulator 110 may be modulated at a first frequency, in which the first group of the plurality of pixels are pixels upon which light having a first wavelength impinges. Modulation of the first group of pixels may impress a first frequency fluctuation (i.e., intensity or phase fluctuation) onto a property of an output light directed from the spatial light modulator 110 including the first wavelength.

At block 404, a second group of the plurality of pixels in the spatial light modulator 110 may be modulated at a second frequency, in which the second group of the plurality of pixels are pixels upon which light having a second wavelength impinges. Modulation of the second group of pixels may impress a second frequency fluctuation (e.g., intensity or phase fluctuation) onto a property of an output light directed from the spatial light modulator 110 including the second wavelength. The groups of pixels may be modulated at different frequencies to thus impress different frequency fluctuations onto light having different wavelengths.

Although block 404 is depicted in FIG. 4 as being implemented following block 402, it should be understood that block 404 may be implemented concurrently with block 402. For instance, block 402 may be implemented on a first group of pixels while block 404 is simultaneously implemented on a second group of pixels. In addition, the groups of pixels may be modulated in any of the manners discussed above. Moreover, it should be understood that the first group of pixels and the second group of pixels may refer to respective groups of pixels on which any wavelengths of light impinge. In this regard, the first group of pixels and the second group of pixels should not be construed as necessarily referring to particular groups of pixels arranged in any particular order on the spatial light modulator 110.

Turning now to FIG. 5, at block 502, respective groups of pixels may be modulated at multiple respective frequencies. Each of the respective groups of pixels may correspond to the wavelengths of light impinging on the pixels. For instance, a first group of pixels may include those pixels upon which a first wavelength of light impinges, a second group of pixels may include those pixels upon which a second wavelength of light impinges, and so forth. Thus, at block 502, an output light from the spatial light modulator 110 may include a property that is fluctuated at multiple frequencies depending upon the wavelengths of the light contained in the output light. In addition, the frequency fluctuations may be impressed onto the output light in any of the manners described above.

At block 504, fluctuations in a property of the output light directed from the spatial light modulator may be detected over a period of time. For instance, the optical detector 232 (FIG. 2) or the optical detectors 320-320*m* (FIG. 3) may detect the property. That is, the optical detector 232 or detectors 320*a*-320*m* may detect the rate or rates at which the property of the output light fluctuates over a period of time to determine the frequency of property fluctuation of the output light. As discussed above, the property of the output light may be power, e.g., intensity, phase, polarization state, etc. In an example, therefore, the optical detector 232 or detectors 320*a*-320*m*, which may be sensitive to phase changes, may detect the rate or rates at which the phase of the output light fluctuates over a period of time to determine the frequency of phase change fluctuation of the output light and hence to infer the power of that optical band. As discussed above, the property, e.g., intensity, phase, etc., of the output light will fluctuate ata frequency that is similar to the frequency or frequencies at which the spatial light modulator 110 modulated the individual wavelengths of light forming the output light.

At block 506, at least one frequency at which the property of the output light fluctuates may be determined from the detected fluctuations over the period of time. For instance, the processor 240 may apply a function, such as the Fourier transform, on the signals received from the optical detector 232 or detectors 320*a*-320*m* to identify the frequency at which the property fluctuates. Particularly, for instance, the signals received from the optical detector 232 or detectors 320*a*-320*m* may include multiple property fluctuation frequencies and the processor 240 may apply the Fourier transform on the signals to distinguish the different property fluctuation frequencies from each other.

At block 508, at least one wavelength of light contained in the output light may be identified from the determined at least one frequency of at which the property of the output light fluctuates. For instance, the processor 240 may access information pertaining to the correlations between frequency fluctuations and optical wavelengths applied by the spatial light modulator 110 and may use this information to identify the at least one wavelength of light contained in the output light. The processor 240 may also determine the power of the identified at least one wavelength of light contained in the output light.

At block 510, the output light may be analyzed according to the identified at least one wavelength of light. For instance, the processor 240 may analyze the output light to perform optical channel monitor and/or optical spectrum analysis functions.

With reference back to block 502, the respective groups of pixels may be modulated at the multiple respective frequencies according to a scheme in which a chirped spatially dependent fluctuation pattern is written along the dispersion direction 116 of the spatial light modulator 110. In other words, at block 502, the driver mechanism may modulate the groups of pixels according to a chirped spatially dependent fluctuation pattern. Examples of a chirped spatially dependent fluctuation pattern are depicted in the graphs 600 depicted in FIGS. 6A-6E.

Figure 6A:
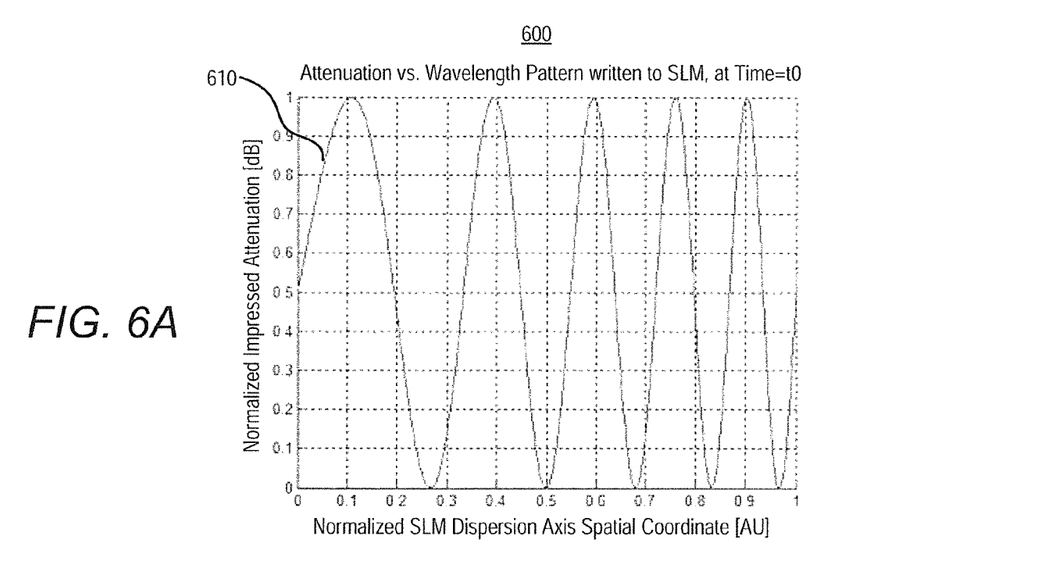
FIGS. 6A-6E respectively show graphs of a spatially dependent insertion loss modulation pattern, according to examples of the present disclosure.
Figure 6B:
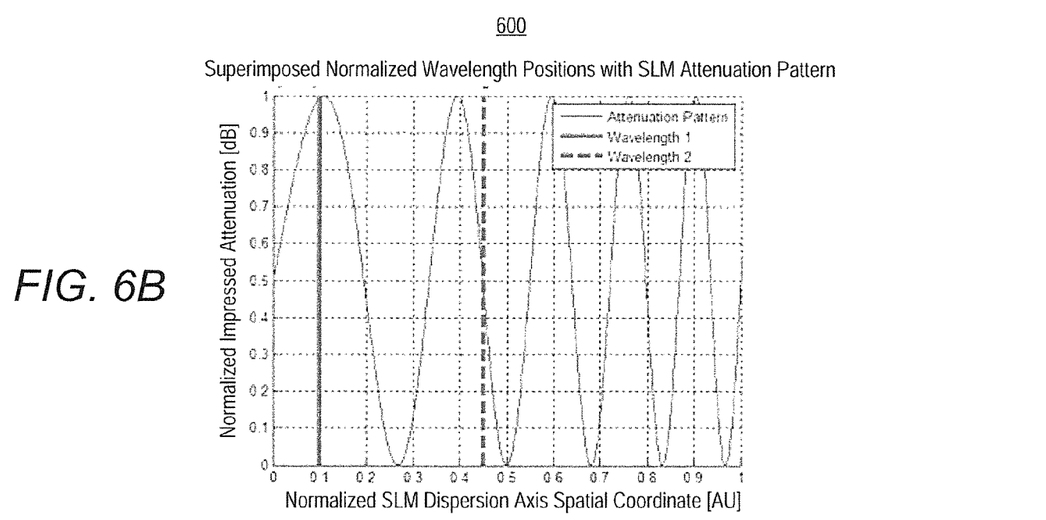
Figure 6C:
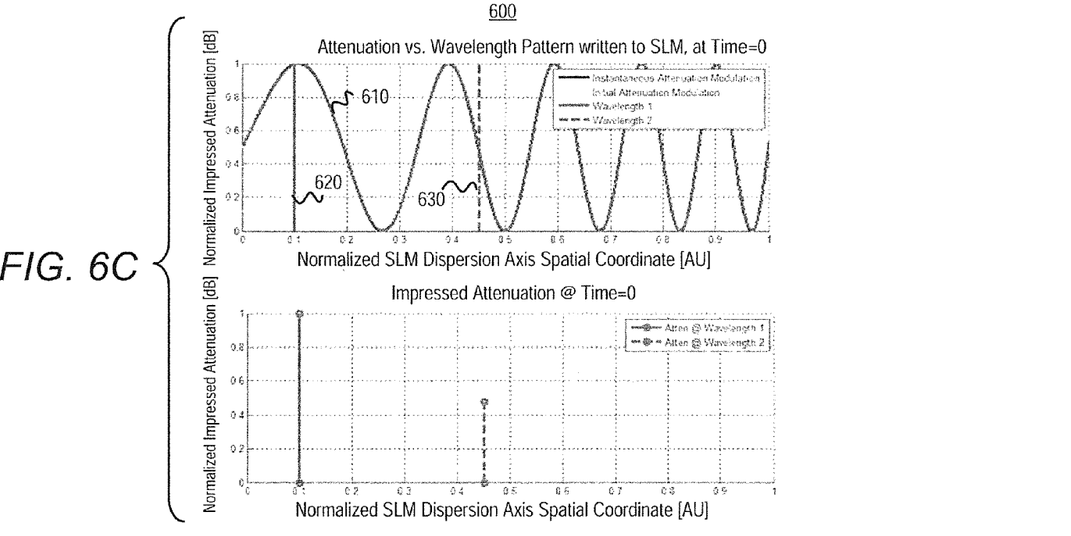

With reference first to FIG. 6A, the graph 600 depicts, along the x-axis, a normalized spatial light modulator (SLM) dispersion axis spatial coordinate, which may be equivalent to the spatial coordinates across the dispersion direction 116. The graph 600 also depicts, along the y-axis, a normalized impressed attenuation, which may be equivalent to the insertion loss. Also shown in the graph 600 is a chirped spatially dependent fluctuation pattern 610 that is to be applied to the groups of pixels according to their positions on the spatial light modulator 110 along the dispersion direction 116. The spatially dependent fluctuation pattern 610 is depicted as including a chirped pattern, e.g., the spatial frequency increases along the increasing x-axis.

In one regard, due to the chirped "loss pattern" or "phase pattern", a time-dependent loss may be created in the output light. The pixels 112*a*-112*n* of the spatial light modulator 110 may be operated to steer light beams away from an output at a particular frequency corresponding to the chirped phase pattern to create the time-dependent loss in the output light. In other examples, the time-dependent loss may be created at the output through application by the spatial light modulator 110 of other fluctuations in the output light, e.g., a detectable time-dependent phase fluctuation, a detectable time-dependent polarization fluctuation, etc. The chirped "loss pattern" or "phase pattern" may differ for differing wavelengths of light to thus impress a different signature into the different wavelengths of light. The relative spectral alignment on the spatial light modulator 110 is depicted schematically in FIG. 6B for two specific wavelengths.

Due to the spatially dependent loss or phase pattern 610 being written in a chirped fashion, each optical wavelength will see a different instantaneous 'spatial frequency' of the pattern. This may result, in general, in each of the wavelengths having a different signature. The attenuation to each wavelength, in the graphs 600 depicted in FIG. 6C, may be found by the intersection of the spectral lines 620, 630 with the attenuation curve 610.

Figure 6D:
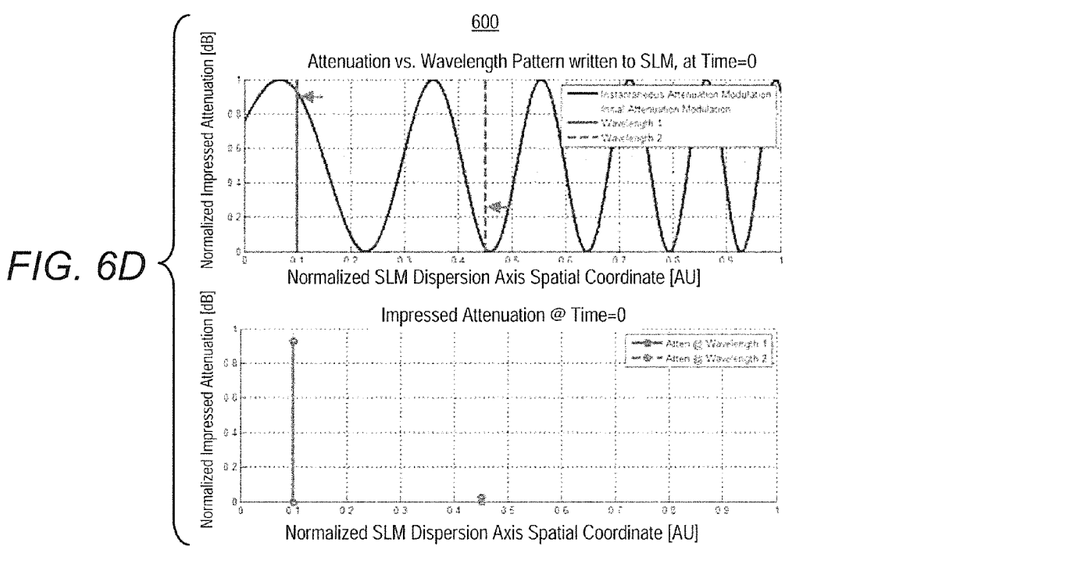

The spatially dependent fluctuation pattern 610 may be swept out quickly across the groups of pixels in the spatial light modulator as shown in FIG. 6D. More particularly, FIG. 6D shows the loss pattern of each channel, at some later time.

Figure 6E:
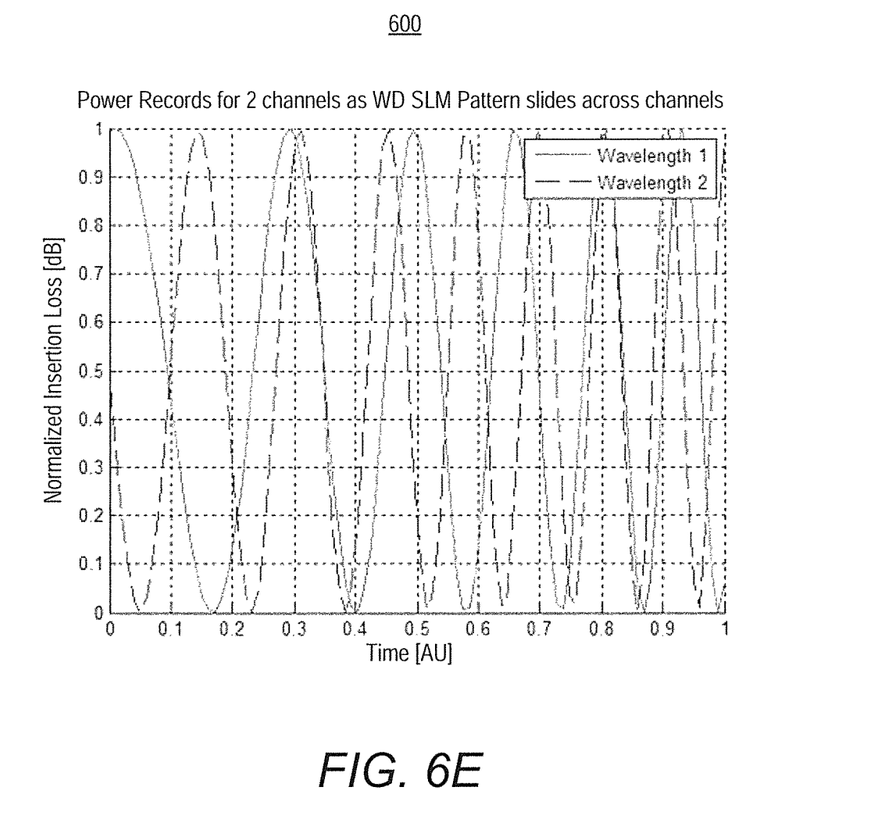

Due to the chirped nature of the spatially dependent loss or phase pattern 610, each wavelength will have a different power-vs-time evolution for finite scan lengths of the spatially dependent loss or phase pattern 610. In this example, it is the spatial chirp and finite scan time that will encode wavelength-dependent time-dependent fluctuation information onto the optical frequencies of the differing wavelengths. Performance of the features described with respect to FIGS. 6A-6D may imprint a wavelength-dependent time-dependent fluctuation information on each wavelength contained in an output light from the spatial light modulator 110 as shown in FIG. 6E.

Some or all of the operations set forth in the methods 400 and 500 may be contained as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 7:
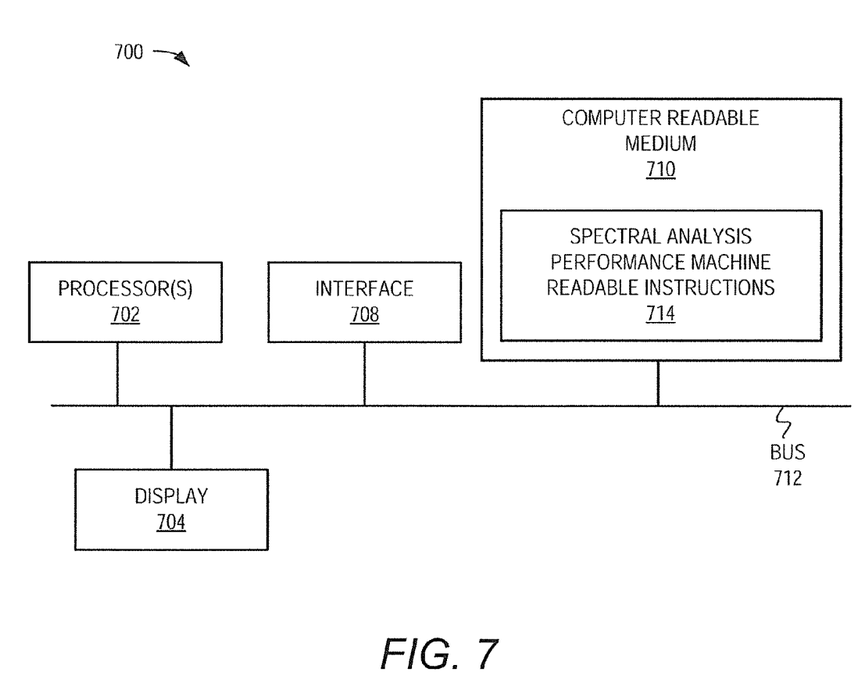
FIG. 7 is schematic representation of a computing apparatus that includes spectral analysis performance machine readable instructions, according to an example of the present disclosure.

Turning now to FIG. 7, there is shown a schematic representation of a computing apparatus 700, according to an example. The computing apparatus 700 may include a processor(s) 702, which may be equivalent to the controller 130 and/or processor 240; a display 704; an interface 708; and a computer-readable medium 710. Each of these components may be operatively coupled to a bus 712. For example, the bus 712 may be an EISA, a PCI, a USB, a FireWire, a NuBus, or a PDS.

The computer readable medium 710 may be any suitable medium that participates in providing instructions to the processor 702 for execution. For example, the computer readable medium 710 may be a non-transitory and a non-volatile media, such as an optical or a magnetic disk; volatile media, such as memory. The computer-readable medium 710 may also store spectral analysis performance machine readable instructions 714, which, when executed may cause the processor 702 to perform some or all of the methods 400 and 500 depicted in FIGS. 4 and 5.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An optical transmission device comprising:
   a spatial light modulator having a plurality of cells, wherein different wavelengths of a light beam are to impinge upon different groups of pixels along a dispersion direction; and
   a driver mechanism to modulate, at a first frequency, a first group of the plurality of cells upon which light having a first wavelength impinges to impress a first frequency fluctuation onto a property of an output light including the first wavelength and to modulate, at a second frequency, a second group of the plurality of cells upon which light having a second wavelength impinges to impress a second frequency fluctuation onto a property of an output light including the second wavelength, wherein the second frequency fluctuation differs from the first frequency fluctuation.

2. The optical transmission device according to claim 1, wherein the driver mechanism is to modulate the first group of the plurality of cells through application of a voltage at a first frequency of oscillation to the first group of the plurality of cells and to modulate the second group of the plurality of cells through application of a voltage at a second frequency of oscillation to the second group of the plurality of cells.

3. The optical transmission device according to claim 1, wherein the driver mechanism is to modulate the first group of the plurality of cells to cause the property of the output light having the first wavelength to fluctuate at a first frequency of fluctuation and to modulate the second group of the plurality of cells to cause the property of the output light having the second wavelength to fluctuate at a second frequency of fluctuation.

4. The optical transmission device according to claim 1, further comprising:
   a controller to control the driver mechanism to modulate the first group of the plurality of cells and the second group of the plurality of cells.

5. The optical transmission device according to claim 1, further comprising:
   at least one optical detector to detect the property of the output light directed from the spatial light modulator; and
   a processor to determine, from fluctuations in the detected property of the output light over a period of time, at least one frequency at which the property of the output light fluctuates.

6. The optical transmission device according to claim 1, wherein the optical transmission device is a wavelength selective switch.

7. The optical transmission device according to claim 5, wherein the at least one optical detector further comprises a plurality of optical detectors that are each to detect the property of the output light, wherein the processor is to determine, from fluctuations in the property of the output light over a period of time detected by the plurality of optical detectors, the at least one frequency at which the property of the output light fluctuates, and wherein the processor is further to determine a power level of the output light.

8. The optical transmission device according to claim 5, further comprising:
   an input to deliver the light beam onto the spatial light modulator;
   a plurality of outputs through which the spatial light modulator is to selectively output light; and
   an optical tap positioned to direct output light from at least one of the plurality of outputs to the at least one detector.

9. A method for performing spectral analysis using a spatial light modulator having a plurality of pixels, wherein different wavelengths of a light beam impinge upon different groups of pixels along a dispersion direction, said method comprising:
   modulating, at a first frequency, a first group of the plurality of pixels upon which light having a first wavelength impinges to impress a first frequency fluctuation onto a property of an output light including the first wavelength; and
   modulating, at a second frequency, a second group of the plurality of pixels upon which light having a second wavelength impinges to impress a second frequency fluctuation onto a property of an output light including the second wavelength of light, wherein the second frequency fluctuation differs from the first frequency fluctuation.

10. The method according to claim 9, wherein modulating the first group of the plurality of pixels further comprises modulating the first group of the plurality of pixels to cause the property of the output light having the first wavelength to fluctuate at a first frequency of fluctuation and wherein modulating the second group of the plurality of pixels further comprises modulating the second group of the plurality of pixels to cause the property of the output light having the second wavelength to fluctuate at a second frequency of fluctuation.

11. The method according to claim 9, wherein modulating the first group of the plurality of pixels and modulating the second group of the plurality of pixels further comprises modulating the first group of the plurality of pixels and the second group of the plurality of pixels according to different chirped spatially dependent fluctuation patterns along the dispersion direction.

12. The method according to claim 9, further comprising:
   detecting fluctuations in the property of the output light directed from the spatial light modulator over a period of time; and
   determining, from the detected fluctuations over the period of time, at least one frequency at which the property of the output light fluctuates.

13. The method according to claim 12, further comprising:
identifying, from the determined at least one frequency at which the property of the output light fluctuates, at least one wavelength of light contained in the output light.

14. The method according to claim 12, wherein detecting fluctuations in the property of the output light further comprises detecting fluctuations in the property of the output light over a period of time in a plurality of detectors, said method further comprising:
processing the fluctuations in the property of the light detected by the plurality of detectors over the period of time to determine at least one frequency of fluctuation in the property of the output light.

15. An optical transmission device comprising:
an input;
a plurality of outputs;
a spatial light modulator having a plurality of pixels;
optics to disperse a light beam received through the input onto the spatial light modulator such that different wavelengths of the light beam impinge on different groups of pixels along a dispersion direction, wherein the spatial light modulator is to selectively direct output light to the plurality of outputs;
a driver mechanism to modulate, at a first frequency, a first group of the plurality of cells upon which light having a first wavelength impinges to impress a first frequency fluctuation onto a property of an output light including the first wavelength and to modulate, at a second frequency, a second group of the plurality of cells upon which light having a second wavelength impinges to impress a second frequency fluctuation onto a property of an output light including the second wavelength, wherein the second frequency fluctuation differs from the first frequency fluctuation; and
at least one optical detector to detect the property of the output light.

16. The optical transmission device according to claim 15, further comprising:
a processor to determine, from fluctuations in the detected property of the output light over a period of time, at least one frequency at which the property of the output light fluctuates, wherein the processor is to identify, from the determined at least one frequency at which the property of the output light fluctuates, at least one wavelength of light contained in the output light.

17. The optical transmission device according to claim 15, further comprising:
an optical tap positioned to direct a portion of the output light directed through an output of the plurality of outputs to the at least one optical detector.

18. The optical transmission device according to claim 15, wherein the driver mechanism is to modulate the first group of the plurality of pixels and the second group of the plurality of pixels according to different chirped spatially dependent fluctuation patterns along the dispersion direction.

19. The optical transmission device according to claim 15, wherein the property is at least one of intensity, phase, and polarization state.

20. The optical transmission device according to claim 16, wherein the at least one optical detector comprises a plurality of optical detectors, said optical transmission device further comprising:
a beamsplitter positioned to direct portions of the output light directed through the plurality of outputs to the plurality of optical detectors, wherein the plurality of optical detectors are to each detect the property of the output light, and wherein the processor is to determine, from fluctuations in the property of the output light over a period of time detected by the plurality of optical detectors, the at least one frequency at which the property of the output light fluctuates.

* * * * *